United States Patent [19]

Fundell

[11] 4,412,401
[45] Nov. 1, 1983

[54] APPARATUS FOR PROCESSING TUBES

[75] Inventor: Bo W. Fundell, Alvkarleby, Sweden

[73] Assignee: Skutskars Rostfria AB, Skutskar, Sweden

[21] Appl. No.: 269,026

[22] PCT Filed: Oct. 1, 1980

[86] PCT No.: PCT/SE80/00236
§ 371 Date: May 29, 1981
§ 102(e) Date: May 29, 1981

[87] PCT Pub. No.: WO81/00821
PCT Pub. Date: Apr. 2, 1981

[30] Foreign Application Priority Data

Oct. 1, 1979 [SE] Sweden ............... 7908103

[51] Int. Cl.³ ............... B24B 5/34; B24B 27/04
[52] U.S. Cl. ............... 51/103 R; 51/99; 51/240 T; 82/4 C; 82/86; 266/57
[58] Field of Search ........... 51/48 R, 99, 103 R, 51/103 WH, 103 TF, 215 SF, 215 AR, 236, 240 R, 240 T, 33 R, 33 W, 47; 82/4 C, 78, 86, 87, 89, 90, 101; 83/490; 144/208 G, 208 J, 246 A, 246 B; 219/60 A; 266/57; 269/58, 59, 71, 289 MR; 414/433

[56] References Cited

U.S. PATENT DOCUMENTS

| | | | |
|---|---|---|---|
| 2,680,607 | 6/1954 | Hollinger | 51/236 |
| 2,811,874 | 11/1957 | Rethoret | 51/99 X |
| 3,292,468 | 12/1966 | Orthey | 82/101 |
| 3,562,959 | 2/1971 | Dooley | 51/99 X |
| 3,572,199 | 3/1971 | Harden | 266/57 X |
| 3,656,734 | 4/1972 | Davis | 266/57 X |
| 4,052,039 | 10/1977 | Koyano et al. | 266/57 |
| 4,349,182 | 9/1982 | Blackburn | 266/57 |

FOREIGN PATENT DOCUMENTS

| | | | |
|---|---|---|---|
| 2709024 | 9/1978 | Fed. Rep. of Germany | 82/86 |
| 1206661 | 2/1960 | France | 266/57 |
| 555719 | 11/1974 | Switzerland | |
| 679731 | 9/1952 | United Kingdom | 266/57 |

Primary Examiner—James G. Smith
Assistant Examiner—Robert P. Olszewski
Attorney, Agent, or Firm—Charles A. Brown

[57] ABSTRACT

An apparatus for processing especially heavy metal tubes comprises a frame supported by wheels, the frame having a plurality of supports consisting of rollers which may together support the tube to be processed. With a support which is quickly movable along the frame a bearer is associated which carries a processing tool, e.g. a grinding cross cut machine, as well as driving means for mechanically putting the tube into rotation during a processing operation. The driving means may also be used for giving the tube a longitudinal movement during simultaneous rotation thereof.

10 Claims, 11 Drawing Figures

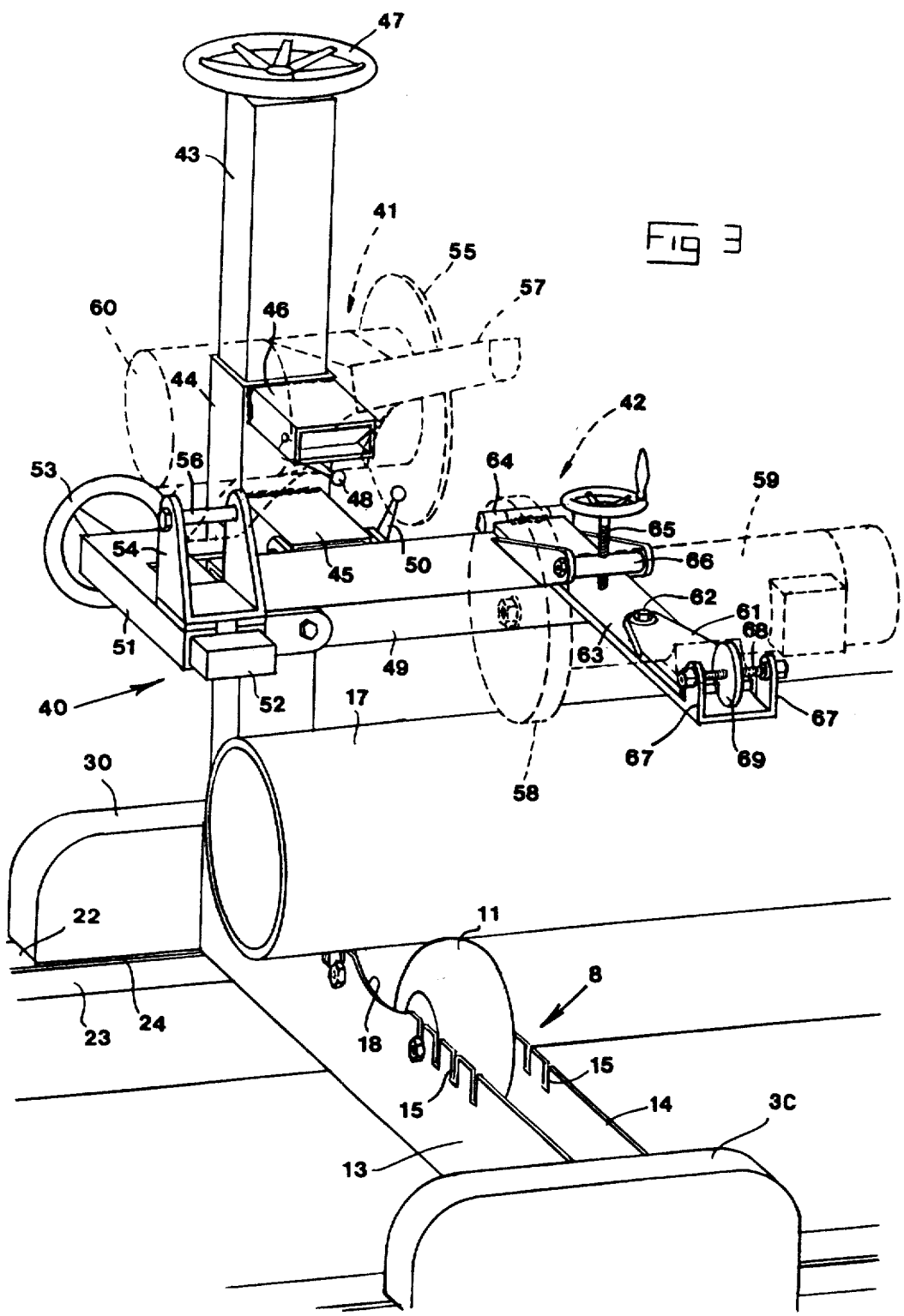

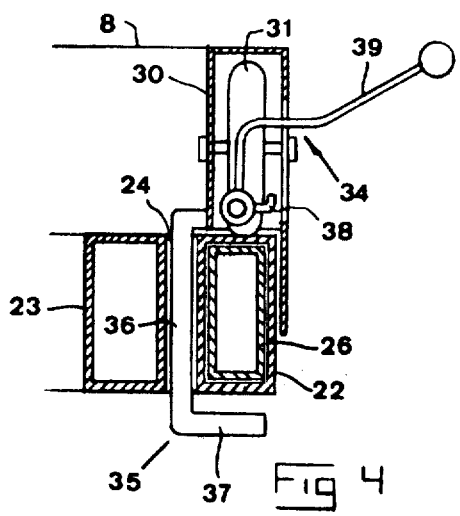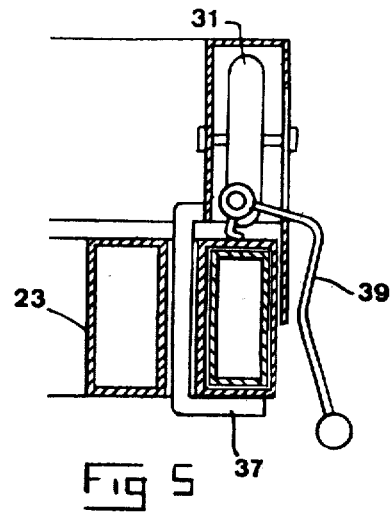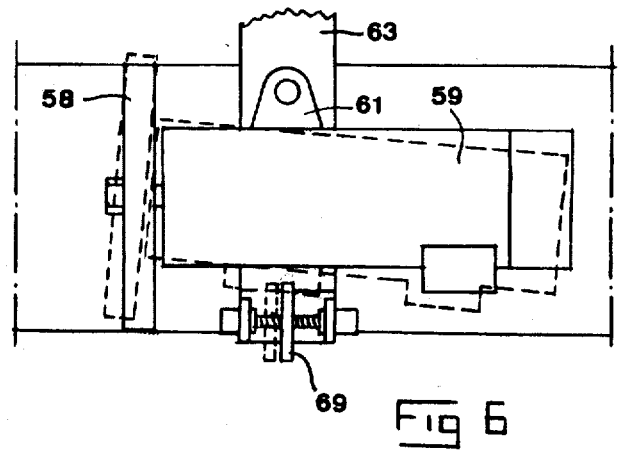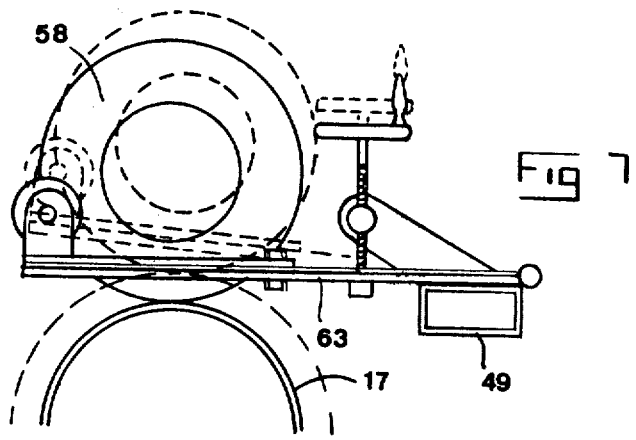

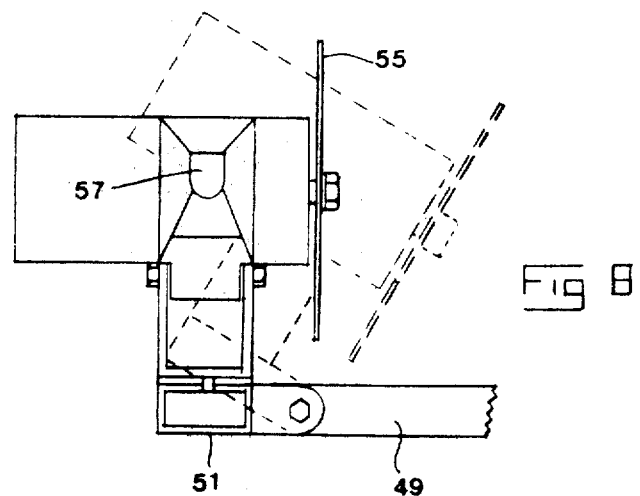
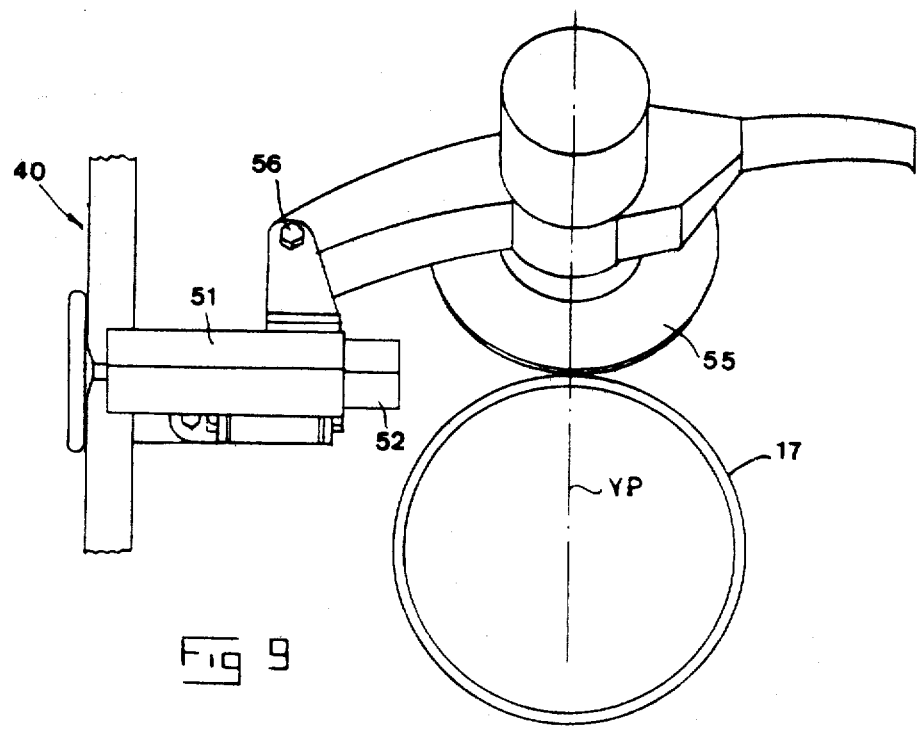

4,412,401

APPARATUS FOR PROCESSING TUBES

TECHNICAL FIELD

This invention refers to an apparatus for processing tubes, particularly heavy metal tubes, comprising a supporting device associated with a frame and arranged to support a tube and upon processing, e.g. cross cutting, welding or grinding the tube allowing rotation of the same relative to the supporting device and consequently relative to the processing tool in question, said supporting device comprising a plurality of supports which are mutually spaced apart in the longitudinal direction of the apparatus and each of which includes two rotary or roller elements.

THE PRIOR ART

An apparatus of the art described above is in all essentials previously known by Swiss patent specification No. 555 719. In this known apparatus, however, the processing tool—which in practice consists of a cross cut grinding wheel—is axially immovable relative to the supporting device. When a tube piece having a certain, often accurately settled length shall be cut off a longitudinal movement of the tube in question along the supporting device is therefore needed so as to locate the point at which the tube shall be cut just in front of the cutting wheel. More precisely this is done by means of a dog which is applied to one end of the tube and displaces this tube along the supporting device until the opposite end abuts and is stopped by a stop which has previously been positioned in a desired position relative to the cutting wheel. To displace the tube axially along the supporting device in this manner may perhaps be done as long as lightweight or medium tubes are involved. However, as soon as heavy tubes shall be handled, e.g. metal tubes having a weight in the region of 500 to 1,500 kg, the apparatus is no longer fit for use in practice because such tubes cannot be displaced at the same time as they rest on the supports due to the fact that the frictional resistance is too great.

DESCRIPTION OF THE INVENTION

The present invention aims at eliminating the above-mentioned limitations of the apparatus previously known and create opportunities for a simple and quick finding of the appropriate mutual position between the processing tool and the tube without absolute necessity of lifting the tube, independently of the weight thereof. According to the invention this is achieved by the fact that the processing tool is connected to a support which is movable relative to the other substantially stationary supports included in the supporting device in order to allow the movable support and thereby the tool itself to be moved to various positions of adjustment along the longitudinal axis of the tube or the supporting device at the same time as a tube lies resting on said stationary supports.

SHORT DESCRIPTION OF THE DRAWINGS

With reference to the attached drawings a more detailed description of an embodiment of the apparatus according to the invention put forward as an example will follow hereinafter.

In the drawings;

FIG. 3 is a perspective view illustrating a bearer for the driving device and the processing tool of the apparatus; said two components being shown in dashed lines for the sake of clarity;

FIGS. 4 and 5 are detailed cross sections illustrating an eccentric locking device for a support of the apparatus, the eccentric locking device being shown in a releasing position in FIG. 4 and in a locking position in FIG. 5;

FIG. 6 is a detailed view of the driving device of the apparatus seen from above;

FIG. 7 is an end view of the same driving device;

Figure 10:
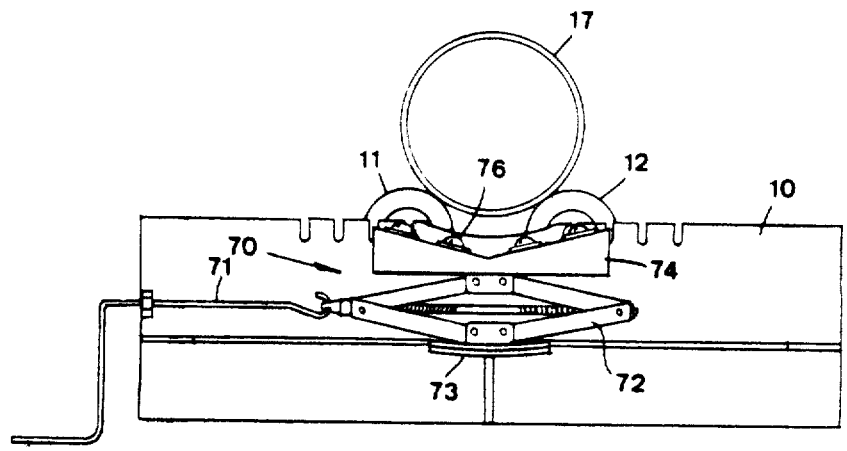
Figure 11:
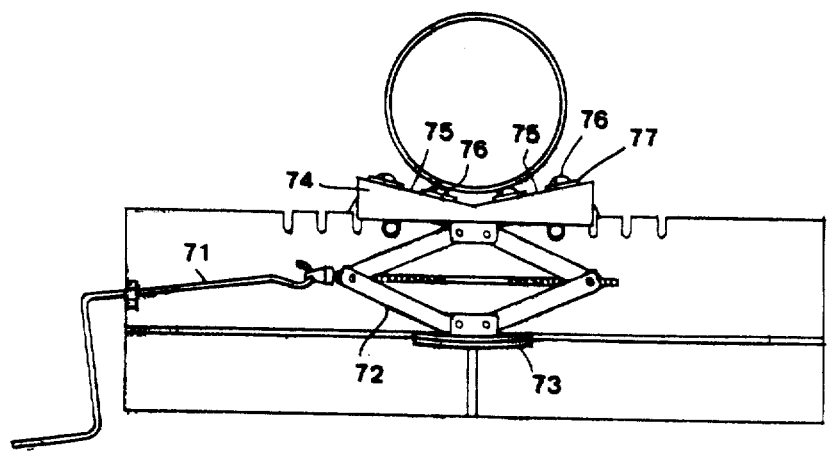

FIGS. 8 and 9 detailed sectional views illustrating a processing tool in the form of a cross cutting grinding saw belonging to the apparatus, and FIGS. 10 and 11 end views illustrating a lifting device in two different positions, said device being designed as an extra fitting.

A PREFERRED EMBODIMENT OF THE INVENTION

The apparatus shown in the drawings comprises a frame which in its entirety is designated 1 and which in this case is supported by means of wheels 2, 3 in a known or arbitrary manner so as to be capable of being transported between different processing places, e.g. in a stock-room for tubes. Suitably the frontal pair of wheels 2 is pivotally connected to the frame 1 so that the wheel pair in question may be rotated by means of a guide rod 4 with a view to adjusting the direction of travel of the frame in any desired manner.

A supporting device generally designated 5 comprises a plurality of individual supports 6, 7, 8, 9 and 10 which are mutually spaced apart in the longitudinal direction of the apparatus and each of which includes two rotary or roller elements 11, 12. More precisely these roller elements consist of rubber wheels which on opposite sides conventionally have projecting journals which are journalled on the support in the manner described closer below. The number of supports should, as a minimum, be four, though five supports have been preferred in the current embodiment. One or more of the supports are movable between different positions along the longitudinal axis of the apparatus so as to make it possible to support two tubes or tube pieces having varying lengths in alignment with each other. In the embodiment shown all of the five supports are in practice movable along the apparatus, though only one, namely the support 8 is designed in such a manner that it may quickly be moved between the different positions of adjustment. The other four supports require somewhat more complicated measures in order to be moved and in practice they may therefore be considered as stationary supports.

Figure 1:
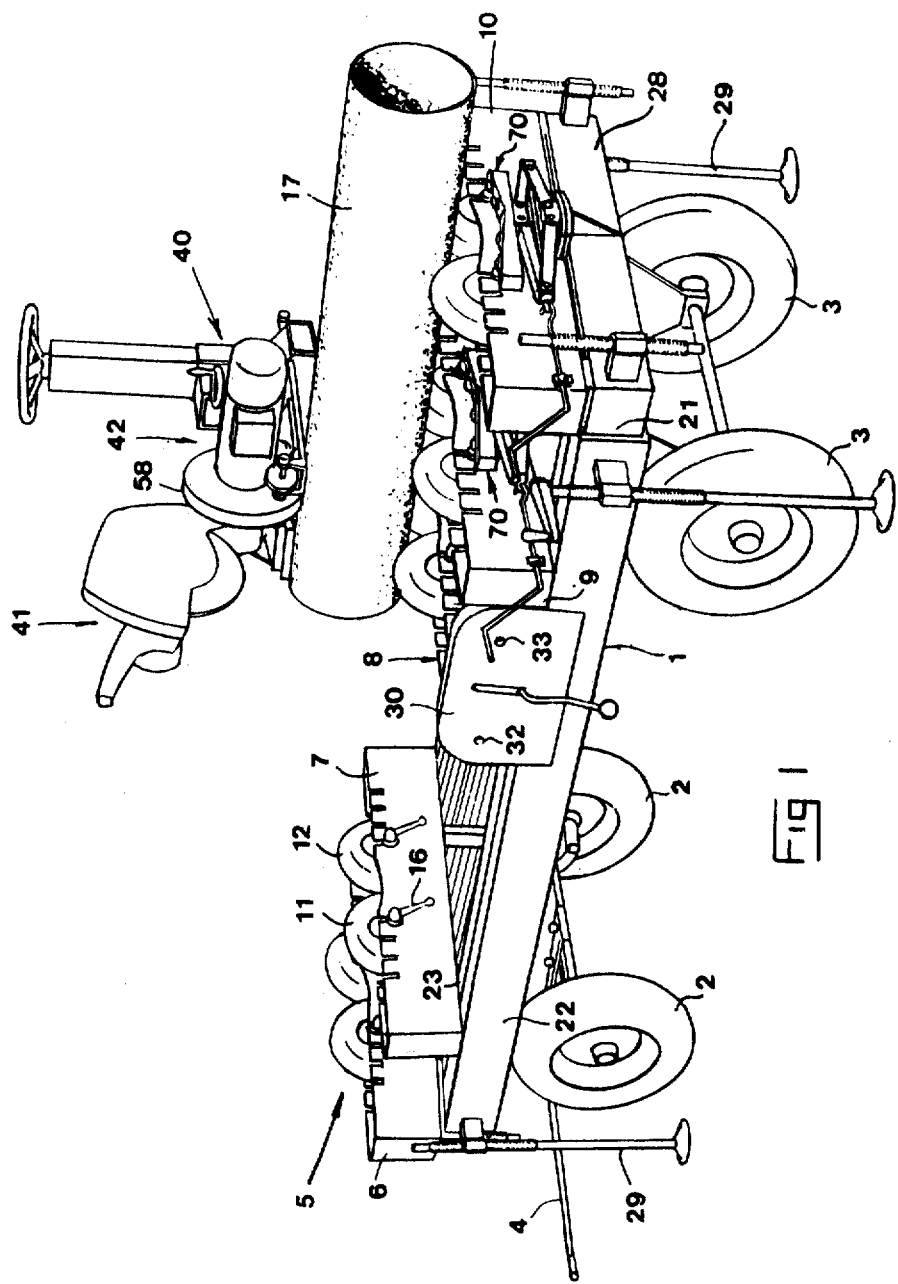
FIG. 1 is a perspective view showing the apparatus of the invention in its entirety.
Figure 2:
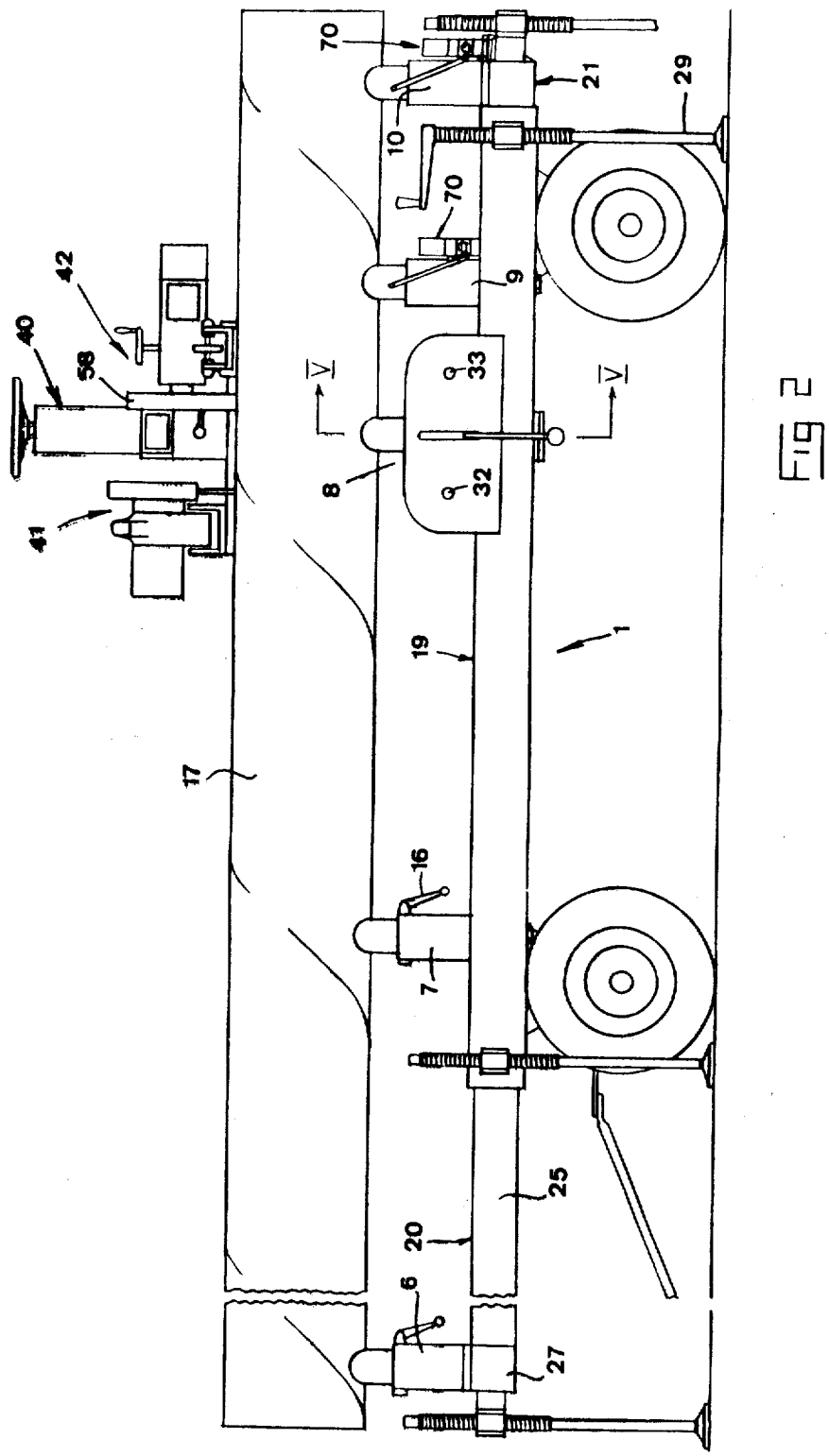
FIG. 2 is a sectional view of the same apparatus.

Each single support consists of a long box structure comprising two long mutually spaced apart side members 13, 14 (see FIG. 3) which at their ends are connected to each other by means of suitable end members. In the two side members 13, 14 a series of receivers is arranged, said receivers being present in the form of upwardly open indents 15 the purpose of which is to receive the aforesaid journals of the roller elements or rubber wheels 11, 12. Each wheel is provided with a quick coupling device 16 (see FIGS. 1 and 2) by means of which the wheel may be quickly and simply mounted in the indent desired. In the specific example shown four mutually spaced apart indents are arranged in each side member for the individual wheel. By moving the wheels 11, 12 between different indents the distance between the wheels may be decreased and increased respectively dependent on the diameter in question of the tube 17, 17' to be processed. It should be noted that the two side members 13, 14 at the center thereof have curved recesses 18 which may eventually accommodate the bottom portion of the tube.

All of the five supports extend perpendicularly to the longitudinal axis of the apparatus or the frame 1 and the wheel pairs are located after one another along a straight line in the longitudinal direction of the frame.

In the embodiment shown the frame 1 itself consists of a main part 19 as well as two extension parts 20 and 21. The main frame part 19 is in turn composed of two pairs of longitudinal beams in the shape of box girders, namely two outer beams 22 (see FIGS. 4 and 5) and two inner beams 23 located inside these, said inner beams being arranged at a small distance inside said outer beams 22 while leaving a narrow gap 24 between the beams. These beams or box girders are, at their ends, in a suitable way connected to each other by means of end beams or end members not shown, said end members being arranged in such a manner that the two outer beams 22 are open at one end of the main frame part, while the inner beams 23 are open at the opposite end thereof. Each individual extension part 20 and 21 respectively consists of two long box girders 25 and 26 respectively having such dimensions that they may be inserted in the above mentioned box girders 23 and 22 respectively. At their ends which are directed away from the main frame part 19 the extension beams of each extension part are connected to each other by means of end beams 27 and 28 respectively (see FIGS. 1 and 2) while forming a substantially U-shaped configuration as seen from above. At said ends of the extension parts 20, 21 also the supports 6 and 10 respectively being most remote from each other are supported. The extension beams 25 of the part 20 are inserted in the inner box girders 23 of the main frame part 19, while the extension beams 26 of the other extension part 21 are inserted in the outer box girders 22 of the main frame part 19. By displacing the extension part 20 and 21 to their outmost positions thereof in relation to the main frame part 19 the distance between the two outermost supports 6 and 10 may be substantially trebled in comparison with the intitial position they assume when the extension parts are fully inserted in the main frame part. Thus, if the main frame part itself has a length of about 2 meters the distance between the outermost supports 6, 10 may be increased to the magnitude of about 6 meters by pulling out the extension parts, meaning that tubes having lengths of about 10 to 11 meters can be supported by the supporting device in question.

The main frame part 19 as well as the extension parts 20 and 21 have screw-operated supporting legs 29 which in cooperation with levels (not shown) attached to said parts may be used for adjusting said parts and thereby the supports 6 to 10 vertically so as to accurately bring the supports on level or in line with each other. The use of the supporting legs is particularly important when the extension part are pulled out to their outermost positions relative to the main frame part. It should be observed that the supporting legs 29 are arranged in pairs on either side of the main frame part and the extension part.

As previously indicated the very support 8 is designed in such a manner that it may be quickly moved between and locked in different positions along the main frame part. This is realized by providing the two opposite ends of the box structure or the side members 13, 14 with wheel housings 30 in each of which a pair of running wheels are journalled. These running wheels 31 are best seen in FIGS. 4 and 5, while the shafts of the respective wheels are indicated with 32, 33 in FIGS. 1 and 2. A locking device generally designated 34 is associated with one of the two wheel housings 30, the design and the function of said device best appearing from FIGS. 4 and 5. This device comprises a C-shaped yoke member 35 attached to the inner surface of the wheel housing 30, said member having a vertical shank 36 located in the gap 24 between the box girders 22, 23 and a bottom shank 37 located below the outer beam or box girder 22. An eccentric element 38 is journalled in any suitable manner within the housing 30, said eccentric element being pivotable from a releasing position in FIG. 4 to a locking position according to FIG. 5 by means of a control handle 39. In the releasing position according to FIG. 4 the current end of the support 8 is supported by means of the two wheels 31 included in the housing 30 and the bottom shank 37 of the yoke 35 is located on a certain level below the beam 22, meaning that the support 8 is free to be rolled along the main frame part 19 to a desired position anywhere between the supports 7 and 9. In the locking position according to FIG. 5 on the contrary the eccentric element 38 has by pivoting the control handle 39 lifted the wheel housing 30 to a position in which the wheel 31 has lost its contact with the top surface of the beam 22 at the same time as the bottom shank 37 of the yoke 35 is brought to a clamping contact against the bottom surface of the beam 22. In this position the movable support 8 is fixed relative to the main frame part 19.

It should be noted that one end of the movable support 8 in the position according to FIG. 4 is somewhat lowered, which means that the supporting rollers or wheels 11, 12 are also somewhat lowered in relation to the corresponding supporting wheels of the other supports, whereby the support 8 may be freely moved without any frictional contact between the supporting wheels and a tube supported by the supporting device. In the position according to FIG. 5 on the contrary the support has been lifted so that the supporting wheels are level with the supporting wheels of the other supports.

A bearer generally designated 40 is associated with the support 8, said bearer being arranged to support a processing tool 41 as well as a driving device 42. As appears from FIG. 3 the bearer 40 includes an upright 43 which is enclosed by a collar 44 onto which two brackets 45, 46 are welded. The collar 44 is movable upwardly and downwardly along the upright 43 by being connected to a nut arranged within the upright, through a slot (not visible) on the rear side of the upright, said nut being in engagement with a threaded rod or screw which may be rotated by means of the hand wheel 47. The collar 44 may be locked in an arbitrary position along the upright 43 by means of a locking device 48.

A hanger 49 is pivotally connected to the bracket 45, said hanger being present in the form of a box girder extending substantially parallel to the longitudinal axis of the tube or the supporting device. The hanger 49 may be locked in a desired position of rotation relative to the bracket 45 by means of a clamping device 50. Upon the processing of big tubes the hanger 49 may be shifted to the upper bracket 46.

At one end of the hanger beam 49 a box girder like sleeve 51 is pivotally mounted and within said sleeve a body 52 is arranged, said body being movable in opposite directions in the sleeve by means of a screw-nut arrangement by operating a handle wheel 53 similar to the hand wheel 47 previously described. Through a gap in the sleeve 51 the body 52 is connected to a U-shaped holder 54 for the processing tool 41 which in the embodiment shown consist of a cut grinding saw having a grinding wheel 55. More precisely the tool 41 is pivotally mounted on the holder 54 by a shaft 56, spring means (not shown) always aiming at moving the processing tool to an inoperative position. The tool may be rotated to its operative position by actuating a control handle 57 against the action of said spring means. Like the hanger 49 the sleeve 51 may be locked in a desired position of rotation relative to the hanger by means of a clamping device (not visible in the drawings) similar to the clamping device 50. Thus it is obvious that the grinding wheel 55 of the tool 41 may be shifted between a first position in which the plane of the wheel is directed substantially at right angles to the longitudinal axis of the tube 17 and a second position in which the wheel is inclined relative to the tube axis, for instance in the region of 5° to 30°. This shifting is carried out by rotating the sleeve 51 relative to the hanger 49 in the manner which is best illustrated in FIG. 8.

None the less obvious is that the grinding wheel 55 is slidably movable or displaceable relative to the hanger 49 in a plane at right angles to the tube axis, namely by actuating the control handle 53 and the body 52 which carries the holder 54 of the tool to the desired position. By this possibility of displacement it is guaranteed that the grinding wheel, particularly in the inclined position thereof according to the dashed lines in FIG. 8, is located with the axis of rotation of the wheel situated in or in the vicinity of a vertical plane intersecting the center axis of the tube 17 independently of the degree of wear of the grinding wheel. This is best shown in FIG. 9 from which it will be understood that the axis of rotation of the grinding wheel will be moved out of the vertical plane "VP" through the center axis of the tube when the grinding wheel gradually wears, since the tool pivots about the axis 56. By displacing the tool in the direction outwardly from the bearer 40 towards the tube 17 this wearing of the grinding wheel may be compensated.

The active element of the driving device 42 consists of a suitably rubber-coated pulley 58 which is rotatable at variable speeds by means of a so called variator 59. This variator may, like the motor 60 for the cut grinding wheel 55, be electrically driven, the drive of the variator advantageously being operated by means of a foot pedal (not shown) which may be placed on the floor below or in the vicinity of the apparatus. The variator 59 is attached to a plate 61 which is pivotally connected to an arm 63 by a pivot pin 62, said arm being in turn vertically pivotable relative to the hanger beam 54 by a pivot pin 64. A wheel-controlled screw 65 is arranged in a bar 66 above the arm 63 and has for its task to press the arm and thereby the pulley 58 downwardly so that the pulley abuts against the tube 17 with a certain pressure. This pressing effect may be achieved independently of the tube diameter as illustrated in FIG. 7.

At the farthest end of the arm 63 there are provided two lugs 67 between which a threaded pin 68 extends. A circular metal plate 69 having a central threaded hole engages the pin 68 and by screwing it may be caused to move along the pin. The periphery of the plate 69 is in engagement with a recess at that end of the pivotal plate 61 which is opposite to the pivot pin 62. By moving the plate 69 along the threaded pin 68 the pivotal plate 61 may accordingly be caused to pivot about the pivot pin 62. Due to the fact that the variator 59 is firmly attached to the plate 61 this means in turn that the pulley 58 is movable between different positions of adjustment, namely a first position in which the axis of rotation of the pulley is substantially parallel to the axis of rotation of the tube 17 so as to transmit just a rotary movement to the tube as well as a second position (see the dashed lines in FIG. 6) in which the axis of rotation of the pulley is more or less inclined relative to the axis of rotation of the tube. In this position the tube will get not only a rotary movement but also a translatory movement or displacement in the longitudinal direction of the tube.

It should be noted (see FIG. 2) that the two wheels or roller elements of the movable support 8 are situated between the two vertical planes which are perpendicular to the axial direction of the tube and in which the grinding wheel 55 and the driving pulley 58 are located. By the cooperation between the driving pulley 58 and the support 8 situated in front of the driving pulley on one hand and the supports 9 and 10 situated behind the driving pulley on the other the tube or tube portion in question is thus held in a firm grip during a cutting operation.

The apparatus described operates in the following manner.

When one desires to cross cut a tube, the tube is put onto the supporting device 5 the supports 6, 7, 9 and 10 of which have been adjusted beforehand into the approximate positions which are suitable for the tube length in question. The desired measure indications are put onto the surface of the tube. Thereafter the quick-movable support 8 is moved to the place in which the position of the cutting wheel 55 coincides with the measure indication on the tube, whereupon the support is locked relative to the frame by means of the locking device 34. A check of the adjustment of the driving pulley 58 relative to the axis of the tube follows. This is carried out by setting the tube in rotation at the same time as the operator, by means of a pen applied to the envelope surface of the tube, makes sure that the tube is not displaced in the longitudinal direction thereof. If this would be the case the axis of rotation of the driving pulley 58 is adjusted into parallelism with the axis of the tube by manipulating the circular plate 69 until parallelism between said axes is achieved. After this adjustment the cross cutting is carried out by swinging down the tool 41 against the tube so that the grinding wheel 55 is applied to and cuts into the tube wall at the same time as the tube is allowed to rotate one revolution at a suitable speed. Hereby a cross cut is achieved which is absolutely perpendicular to the longitudinal axis of the tube and the cutting may be carried out with size tolerances of less than 1 mm even in connection with very long and large-sized tubes, also untrained labor being capable of carrying out cross cutting into precise lengths without difficulties.

The apparatus may also in a simple and efficient manner be used for so called joint preparation, i.e. for providing cut surfaces which are inclined relative to the longitudinal axis of the tube so as to form a weld bead accommodating groove between two tubes to be welded together. This is carried out by switching over the sleeve 51 and thereby the grinding wheel 55 to the inclined position shown in FIGS. 8 and 9. Provided that the axis of rotation of the grinding wheel is held with the axis of rotation of the wheel located in or close to the vertical plane intersecting the center axis of the tube 17 also during continued wear of the grinding wheel said grinding wheel can be caused to cut obliquely into the tube wall and thereby provide the cut chamferred at the angle desired.

The apparatus according to the invention may further be used for grinding or smoothing the tube. Then the bearer 40 may be completed by a grinder of a suitable type or alternatively the cutting saw 41 may be removed and substituted for a grinder. When grinding the envelope surface of a tube the axis of rotation of the driving pulley 58 is inclined in the manner previously described so as to transmit to the tube a longitudinal feeding movement simultaneously with the rotary movement in question, the tube being simply and efficiently fed past the grinder in question.

Furthermore the apparatus may be used for welding tubes, either it is about welding together two tube portions which are put onto the supporting device in alignment with each other or welding on various objects, such as flanges or branch pipes. In this application the proper working tool of the apparatus is not utilized but only the supporting device and the driving pulley for rotating the tube. Of course it is however possible to complete the bearer 40 with some sort of automatic welding machine.

In practice the apparatus of the invention, as illustrated in the drawings, may be used for processing tubes having diameters of about 50 to 600 mm. By completing the bearer 40 with suitable extension arms even tubes having diameters of up to about 1,000 mm may however be involved.

Sometimes cross cutting of large-sized tubes into relatively short length occurs in more or less long series. It is possible that tube lengths of 100 to 1,000 mm may be involved, i.e. lengths which are smaller than the distance between the supports 7 and 8. In connection with such a cross cutting operation the tube to be cut is put onto the two fixed supports 9 and 10 which are present at the infeeding end of the apparatus shown to the right in FIGS. 1 and 2, whereafter the short tube lengths are cut by means of the cutting tool 41 in the manner previously described. In order to facilitate the feeding of the tube to another position of processing after each finished cutting operation the apparatus of the invention is equiped with two lifting devices 70 (see FIGS. 1 and 2) arranged on said support 9, 10 and designed as special accessories, one of said devices being illustrated in detail in FIGS. 10 and 11.

As appears from the last mentioned Figures the lifting device in question includes a conventional jack 72 which is actuated by means of a crank 71 and supported on a bracket 73 centrally arranged relative to the support 10 (and 9 respectively), as well as a block 74 supported by the jack 73, said block having two surfaces 75 which together form a V-shaped configuration. On each of these V-forming surfaces a pair of roller elements in the form of balls 76 is arranged, said balls being mounted in and retained by rings 77.

In the position of rest shown in FIG. 10 the block 74 of the respective lifting devices is lowered in such a manner that the balls 76 are situated substantially below the two rubber wheels 11, 12 of the supports 9, 10, said wheels accordingly supporting the tube 17. In the working position according to FIG. 11 the block has, by actuating the jack 72 by means of the crank 71, been raised to a level on which the balls 76 are above the rubber wheels 11, 12 and where the two central balls of each block accordingly have taken over the supporting function of the rubber wheel. By the fact that the balls are mounted freely rotatable in the bearings 77 the tube may now be quickly and easily displaced in the axial direction to the cutting position desired, where lowering of the blocks follows and where the fine adjustment of the cutting tool relative to the tube may be carried out.

POSSIBLE MODIFICATIONS OF THE INVENTION

Of course the invention is not limited merely to the embodiment described above and shown in the drawings. Thus it is possibly to use other means for making the frame movable between different places of processing than the supporting wheels 2, 3. Instead of just two wheels the individual support for the tube may comprise other types of roller elements and possibly include complementary elements in the form of e.g. strips or belts which are supported by the roller element and on which the tube is put. The same thing is applicable to the driving device which instead of a pulley may comprise strips or belts which are applied against a great or small portion of the envelope surface of the tube. Furthermore one or more springs may be associated with the driving device, said springs having the purpose of resiliently urging the driving device against the tube. Instead of balls on the blocks 74 of the lifting devices other roller elements may be used, such as cylinders the axes of rotation of which are at right angles to the longitudinal axis of the tube. It should also be pointed out that the apparatus, of course, may be used for processing other work pieces than just metal tubes, e.g. cement or concrete tubes.

What is claimed is:

1. An apparatus for processing tubes and the like, said apparatus comprising a frame, support means for supporting a tube above said frame and a processing tool for working upon the tube, said support means being a plurality of supports spaced along a longitudinal axis of said frame, each of said supports having two roller elements for permitting rotation of the tube relative to said processing tool, at least one of said supports being movable along said frame, said processing tool being carried by said movable support whereby said processing tool may be moved to various positions along the length of said frame, means for locking said movable support to said frame in a stationary adjusted position, and said locking means including means for raising and lowering said two roller elements of said movable support vertically into and out of contact with a tube supported by others of said supports whereby said movable support and said processing tool may be readily adjusted relative to such a supported tube.

2. An apparatus according to claim 1, wherein said movable support has a bearer supporting said processing tool and a pressing device arranged to urge the tube against said supporting means during processing of the tube so as to hold the tube in a desired position on the supporting device, said processing tool and said pressing device being spaced apart from each other along the longitudinal axis of the frame and said roller elements of said movable support being situated in a vertical plane located between said processing tool and said pressing device.

3. An apparatus according to claim 2, wherein said pressing device comprises at least one rotatably driven pulley for effecting rotation of the tube while urging the tube against said support means.

4. An apparatus according to claim 3, wherein said rotatably driven pulley is movable between a first position in which the axis of rotation of said rotatably driven pulley is substantially parallel to the axis of rotation of the tube wherein a rotary movement is applied to the tube, and a second position in which the axis of rotation of said rotatably driven pulley is oblique to the axis of rotation of the tube wherein a rotary movement is applied to the tube and displacement of the tube along its longitudinal axis results.

5. An apparatus according to claim 1 wherein said movable support is supported on said frame by means of roller members allowing a quick movement of said movable support between positions of adjustment.

6. An apparatus according to claim 2, wherein said processing tool includes a grinding cross cut saw including a grinding wheel means pivotally connecting said saw to said bearer for adjustment of said grinding wheel of the saw between a first position in which the plane of said grinding wheel is directed substantially perpendicularly to the longitudinal axis of said frame and a second position in which said grinding wheel is oblique relative to said frame axis as well as displaceable relative to said bearer in a plane perpendicular to said frame whereby to ensure that said grinding wheel, at least in the above mentioned oblique position, is located with its axis of rotation situated in the vicinity of a plane which intersects the axis of the intended tube independently of the degree of wear of said grinding wheel.

7. An apparatus according to claim 1, wherein said roller elements have journals, each of said supports having a series of receivers for receiving said roller elements journals, said receivers being mutually spaced apart to facilitate a mutual location of said roller elements at different distances from each other for receiving tubes of different diameters.

8. An apparatus according to claim 1 where said frame comprises a main part composed of two pairs of longitudinal beams preferably in the form of box girders and two extension parts each including two beams having in the vicinity of their ends which are remote from the main frame part one of said supports and which are displaceable relative to said longitudinal beams of the main frame part.

9. An apparatus according to claim 1 together with a lifting device associated with said support means, and said lifting device has means for taking over the tube supporting function of said roller elements and provides means for permitting axial displacement of a tube.

10. An apparatus according to claim 1 wherein said raising and lowering means also vertically moves said movable support.

* * * * *